United States Patent
Wu et al.

(10) Patent No.: US 7,801,253 B1
(45) Date of Patent: Sep. 21, 2010

(54) NONLINEAR POST-PROCESSORS FOR CHANNELS WITH SIGNAL-DEPENDENT NOISE

(75) Inventors: Zining Wu, Los Altos, CA (US); Panu Chaichanavong, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 797 days.

(21) Appl. No.: 11/410,688

(22) Filed: Apr. 24, 2006

Related U.S. Application Data

(60) Provisional application No. 60/728,205, filed on Oct. 19, 2005.

(51) Int. Cl.
*H03D 1/00* (2006.01)

(52) U.S. Cl. .................. 375/341; 375/340; 375/263; 375/290; 375/261; 375/264; 714/795; 714/781; 714/794

(58) Field of Classification Search .................. 375/341, 375/340, 263, 261, 290, 264; 714/795, 781, 714/794
See application file for complete search history.

(56) References Cited

U.S. PATENT DOCUMENTS

| | | | |
|---|---|---|---|
| 5,521,945 | A | 5/1996 | Knudson |
| 5,588,011 | A | 12/1996 | Riggle |
| 5,606,464 | A | 2/1997 | Agazzi et al. |
| 5,689,532 | A | 11/1997 | Fitzpatrick |
| 5,889,823 | A | 3/1999 | Agazzi et al. |
| 6,185,175 | B1 | 2/2001 | Zook |
| 6,201,839 | B1 | 3/2001 | Kavcic et al. |
| 6,246,723 | B1 | 6/2001 | Bliss et al. |
| 6,317,419 | B1 | 11/2001 | Olafsson et al. |
| 6,347,391 | B1 | 2/2002 | Uesugi et al. |
| 6,427,220 | B1 * | 7/2002 | Vityaev ....................... 714/781 |
| 6,438,180 | B1 | 8/2002 | Kavcic et al. |
| 6,842,303 | B2 * | 1/2005 | Ichihara et al. ............... 360/65 |
| 6,931,585 | B1 | 8/2005 | Burd et al. |
| 7,155,660 | B1 * | 12/2006 | Burd .......................... 714/795 |

OTHER PUBLICATIONS

Mohammed Ahmed, Paul Davey, Yoshitake Kurihara; Constructive inter-track interference (CITI) codes for perpendicular magnetic recording; Apr. 11, 2004; p. 432-435.*

He, Runsheng and Nazari, Nersi, "An Analytical Approach for Performance Evaluation of Partial Response Systems in the Presence of Signal-Dependent Medium Noise," GLOBECOM 1999—IEEE Global Telecommunications Conference, No. 1, Dec. 1999 pp. 939-943.

Kavcic, A. and Moura, Jose, "The Viterbi Algorithm and Markov Noise Memory," IEEE publication submisson, revised Feb. 1999.

Kavcic, A. and Moura, Jose, "The Viterbi Algorithm and Markov Noise Memory," IEEE Transactions on Information Theory, vol. 46, No. 1, Jan. 2000.

Moon, J., "Discrete-Time Modeling of Transition-Noise-Dominant Channels and Study of Detection of Performance," IEEE Transactions on Magnetics, vol. 27, No. 6, Nov. 1991.

Stefano Galli, "A Novel APP-Based Soft-Output Adaptive Equalizer Exploiting Non-Linear MMSE Fixed-Lag Smoothed Estimates of the Transmitted Symbols," ICC 2001—IEEE International Conference on Communications, No. 1, Jun. 2001 pp. 1084-1088.

Stefano Galli, "Non-Linear MMSe Estimation and SBS-MAP Receivers," IEEE International Symp. on Information Theory, ISIT'00, Sorrento, Italy, Jun. 25-30, 2000.

* cited by examiner

*Primary Examiner*—Eva Y Puente

(57) ABSTRACT

A non-linear post-processor for estimating at least one source of signal-dependent noise is disclosed. The post processor may receive a set of preliminary decisions from a sub-optimal detector along with the sampled data signal. The post-processor may then compute the transition jitter and white noise associated with each preliminary decision in the set and assign a cost metric to each decision based on the total signal noise. The post-processor may output the decision with the lowest cost metric as the final decision of the detector.

44 Claims, 14 Drawing Sheets

NONLINEAR POST-PROCESSORS FOR CHANNELS WITH SIGNAL-DEPENDENT NOISE

CROSS REFERENCE TO RELATED APPLICATION

This application is a non-provisional patent application claiming the benefit of U.S. Provisional Patent Application No. 60/728,205, filed Oct. 19, 2005, which is hereby incorporated by reference herein in its entirety.

BACKGROUND OF THE INVENTION

This invention relates generally to apparatus and methods for decoding communication signals, and, more particularly, to decoding communication signals containing signal-dependent noise.

With the continuing evolution of computer systems, there is an increasing demand for greater storage density. For example, due to advances in technology, the areal densities of magnetic recording media have increased steadily over the past several years. To increase areal densities using longitudinal recording, as well as increase overall storage capacity of the media, the data bits are typically made smaller and put closer together on the magnetic media (e.g., the hard disc). However, there are limits to how small the data bits can be made. If a bit becomes too small, the magnetic energy holding the bit in place may also become so small that thermal energy can cause it to demagnetize. This phenomenon is known as superparamagnetism. To avoid superparamagnetic effects, magnetic media manufacturers have been increasing the coercivity (the "field" required to write a bit) of the media. However, the coercivity of the media is limited by the magnetic materials from which the write head is made.

In order to increase the areal densities of magnetic media even further, many media manufacturers are using perpendicular recording. Unlike traditional longitudinal recording, where the magnetization is lying in the plane of the magnetic medium, with perpendicular recording the media grains are oriented in the depth of the medium with their magnetization pointing either up or down, perpendicular to the plane of the disc. Using perpendicular recording, manufacturers have exceeded magnetic recording densities of 100 Gbits per square inch, and densities of 1 Terabit per square inch are feasible.

However, as storage densities increase, the signal processing of recording channels becomes more difficult. Sources of distortion, including media noise, electronics and head noise, signal transition noise (e.g., transition jitter), inter-track interference, thermal asperity, partial erasure, and dropouts, are becoming more and more pronounced. Particularly troublesome are signal-dependent types of noise, such as transition jitter, because these types of noise are quickly becoming the dominant sources of detection errors. Signal-dependent noise may overwhelm white noise and severely degrade the performance of detectors designed for a white noise channel.

There have been attempts to design detectors to mitigate signal-dependent noise. However, current detectors designed to combat signal-dependent noise have problems. One problem with these types of detectors is their complexity. In order to detect data in the presence of signal-dependent noise, these detectors employ complicated correction schemes, such as modifying the Euclidean branch metric to compensate for the signal-dependent noise or adaptively computing the branch metric. For example, some currently available detection techniques use either a non-linear Viterbi detector assuming the noise is Markov, or a non-linear post-processor with a similar Markov noise model. For a description of a non-linear post-processor with a Markov noise model, see U.S. Pat. No. 6,931,585, to Burd et al., which is hereby incorporated by reference herein in its entirety.

Another problem with current detection techniques is that they only perform well when the variance of the signal-dependent noise is small. This is because the first-order Taylor approximation of the noise process is only valid for small values of variance. Thus, when the signal-dependent noise variance is large, these detection techniques are far from optimal.

Thus, it would be desirable to provide a more robust post-processor architecture for correcting decision errors associated with signal-dependent sources of noise, such as transition jitter and pulse width noise. The post-processor may be used to output the final decision of a sub-optimal detector, such as a linear or non-linear Viterbi detector.

SUMMARY OF THE INVENTION

These and other objects of the invention are accomplished in accordance with principles of the present invention by providing a nonlinear post-processor for correcting or optimizing the output of a signal detector. The post-processor may be used to correct or reduce decision errors due to signal-dependent and/or additive white noise.

The post processor may receive a set of preliminary decisions from a sub-optimal detector along with a sampled data signal (before or after equalization). The post-processor may then compute the transition jitter associated with each preliminary decision in the set and assign a cost metric to each decision. The post-processor may output the decision with the lowest cost metric as the final decision of the detector.

In some embodiments, the post-processor may compute the transition jitter and white noise of the channel so that the overall noise is minimized. In other embodiments, other types of noise, such as pulse width noise, are incorporated into the metric calculations. A sub-optimal detector, such as a linear or non-linear Viterbi detector, may output a set of candidate decisions to the post-processor, which selects the decision with the overall lowest cost.

In one embodiment of the invention, detector means may compute a set of preliminary detector decisions associated with received signal samples. Post-processing means may be used to estimate at least one form of signal-dependent noise associated with each preliminary detector decision and assign a cost metric to each decision based on the noise estimate. Output means may select the decision with the lowest overall cost metric as the final detector decision.

In one embodiment of the invention, a receiver contains signal processing means that may filter a communication signal and generate an input signal. Detector means may then detect the data in the input signal by generating a set of preliminary detector paths corresponding to the data in the input signal. Post-processing means may receive the input signal and the set of preliminary detector paths and estimate at least one form of signal-dependent noise for each path in the set. The post-processing means may also assign a cost metric to each path in the set based on the noise estimate and select the final detector decision.

In one embodiment of the invention, a receiver includes a computer program running on a processor for reading a data signal from a recording channel. The program may include program logic for filtering a communication signal and generating an input signal therefrom. The program logic may then detect data in the input signal by generating a set of preliminary detector paths corresponding to the data in the input signal. The program logic may estimate at least one form of signal dependent noise for each path in the set and assign a cost metric to each path based on the noise estimate. One of the preliminary detector paths in the set may be selected by the program logic based on the cost metrics.

In one embodiment of the invention, a computer program running on a processor is provided for correcting the output of a sub-optimal detector. The program may include program logic to generate a set of preliminary detector decisions for received signal samples. The program logic may then estimate at least one form of signal dependent noise associated with each preliminary decision in the set and assign a cost metric to each decision based on the noise estimate. The program logic may then output the decision with the lowest cost metric as the final detector output.

In one embodiment, the post-processor of the present invention is part of a receiver including signal processing circuitry to filter a communications signal and generate an input signal therefrom. A signal detector may receive the input signal and generate a set of preliminary detector decisions. A post-processor may then compute the transition jitter associated with each preliminary decision in the set and assign a cost metric to each decision. The post-processor may then output the decision with the lowest noise cost as the final decision of the detector.

Further features of the invention, its nature and various advantages, will become more apparent from the accompanying drawings and the following detailed description.

DETAILED DESCRIPTION OF THE PREFERRED EMBODIMENTS

Embodiments of the present invention relate to apparatus and methods for post-processing data channels, particularly magnetic recording channels. However, the present invention can be used to post-process any communication channel in which a sub-optimal detector is used, such as optical and magneto-optical channels.

Figure 1:
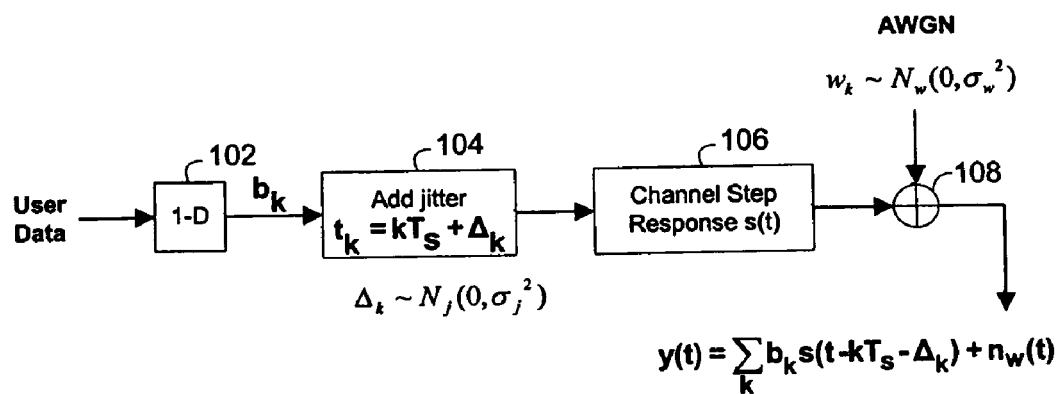
FIG. 1 is a simplified block diagram of an illustrative noise model for a recording channel in accordance with one embodiment of the invention.

FIG. 1 depicts a simplified block diagram of illustrative noise model 100 for a typical recording channel. User data (perhaps selected from the set $\{+1, -1\}$) may be converted to the form of signed NRZI by block 102 resulting in data signal $b_k$. This signal may indicate whether there is a transition in the data signal and also the polarity of the transition, if it exists. Noise in the form of transition jitter may then be added to the signal at block 104, where the transition jitter, $\Delta_k$, may be modeled by a noise process $N_j$ having a mean of 0 and a standard deviation of $\sigma_j$. This signal may then be applied to the channel step response s(t) at block 106. For modeling purposes, additive white noise, $w_k$, may also be added to the signal at adder 108. The additive white noise may be modeled by a noise process $N_w$ with a mean of 0 and a standard deviation of $\sigma_w$. The resulting signal of noise model 100 may be the convolution of data signal $b_k$ and the channel step response plus some white noise:

$$y(t) = \sum_k b_k s(t - kT_s - \Delta_k) + n_w(t) \quad \text{(EQ 1)}$$

Figure 2:
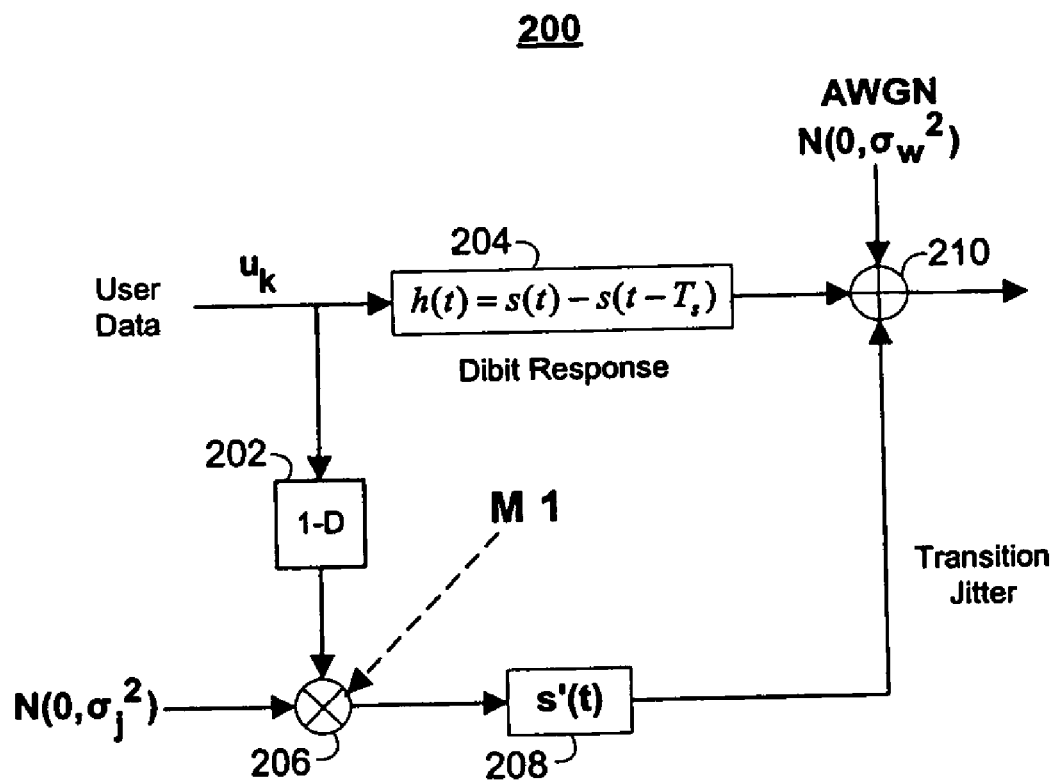
FIG. 2 is an illustrative linearized noise model for small transition jitter noise in accordance with one embodiment of the invention.

FIG. 2 shows illustrative linearized noise model 200 for small transition jitter noise. The example of FIG. 2 uses a first order Taylor approximation of the transition jitter, i.e.:

$$s(t-kT_s-\Delta_k) \approx s(t-kT_s) - \Delta_k s'(t)|_{t=kT_s} \quad \text{(EQ 2)}$$

Similar to FIG. 1, the user data, $u_k$, may be passed through block 202. Since transition jitter is only present when there is a transition in the user data (e.g., from +1 to −1 or from −1 to +1), multiplication unit M1 may be used to model the transition jitter. The output of multiplier 206 may be applied to differentiated step response 208, resulting in a value of the transition jitter. This value may be added to dibit response 204 (the response of two adjacent transitions in the user data) and an additive white noise process by adder 210.

FIG. 2 uses a first-order Taylor approximation of the transition jitter. As previously discussed, this approximation is not an optimal approximation for noise processes with a high variance. However, the second order approximation for the transition jitter is closer to optimal, but computationally expensive. Therefore, to reduce the complexity of the post-processor, some embodiments of the invention compute a finite number of second order approximations corresponding to a finite number of preliminary detector decisions, or survival paths, $b_k$. The second order approximation for the transition jitter may be represented by:

$$s(t - kT_s - \Delta_k) \approx s(t - kT_s) - \Delta_k s'(t)|_{t=kT_s} + \frac{\Delta_k^2}{2} s''(t)|_{t=kT_s} \quad \text{(EQ 3)}$$

If the output of s(t), s'(t), and s"(t) at sampling time $t=kT_s$ is represented by $h_k$, $g_k$, and $f_k$, respectively, and assuming the target is equalized to causal form, the signal output $y_k$ corresponding to survival path $b_k$ may be represented as:

$$y_k = \sum_{l=0}^{L-1} b_{k-l} \cdot h_l - \sum_{m=M_1}^{M_2} b_{k-m} \cdot \Delta_{k-m} g_m + \sum_{n=N_1}^{N_2} b_{k-n} \cdot \Delta_{k-n}^2 \frac{f_n}{2} + w_k \quad (EQ\ 4)$$

where $M_1 < M_2$ and $N_1 < N_2$. By sampling the signal output $y_k$ (either before or after equalization), the noise attributed to transition jitter, $\Delta_k$, can be estimated from time $K_2$–min $(M_1, N_1)$ to time $K_1$–min$(M_2, N_2)$. In addition, the white noise, $w_k$, can also be estimated from time $K_1$ to $K_2$ such that overall noise is minimized. This is equivalent to the optimization problem of minimizing the decision metric, $\epsilon^2$, where $$\varepsilon^2 = \sum_{k=K_1-max(M_2,N_2)}^{K_2-max(M_1,N_1)} \frac{\Delta_k^2}{\sigma_j^2} + \sum_{k=K_1}^{K_2} \frac{w_k^2}{\sigma_w^2} \quad (EQ\ 5)$$

while still satisfying EQ 4. The first term in EQ 5 may represent the cost associated with one or more sources of signal-dependent noise, such as transition jitter. The second term in EQ 5 may represent the cost metric associated with additive white noise. EQ 5 has a unique solution and can be readily computed by well-known optimization algorithms. For example, an iterative method of solving EQ 5 is depicted in algorithm 500 of FIG. 5 (described below). In some embodiments, a separate decision metric $\epsilon^2$ may be computed for each preliminary decision, b". Unlike traditional trellis-based algorithms that consider all possible paths in the trellis, the number of the preliminary decisions considered using this algorithm may be finite. Therefore, the complexity of the system as a whole may be greatly reduced.

In some embodiments, instead of approximating the transition jitter, $\Delta_k$, and the white noise, $w_k$, a look-up table may be used. This may help reduce computation. Given the signal output $y_k$ and the preliminary detector decision $b_k$, the noise values $\Delta_k$ and $w_k$ (and even the decision metric $\epsilon^2$) may be obtained from the look-up table. Additionally or alternatively, a look-up table may also be used to evaluate EQ. 4. So, for example, given noise values $\Delta_k$ and $w_k$, the expected signal output corresponding to survival path $b_k$ may be obtained from a table and then compared to the actual received signal.

Figure 3:
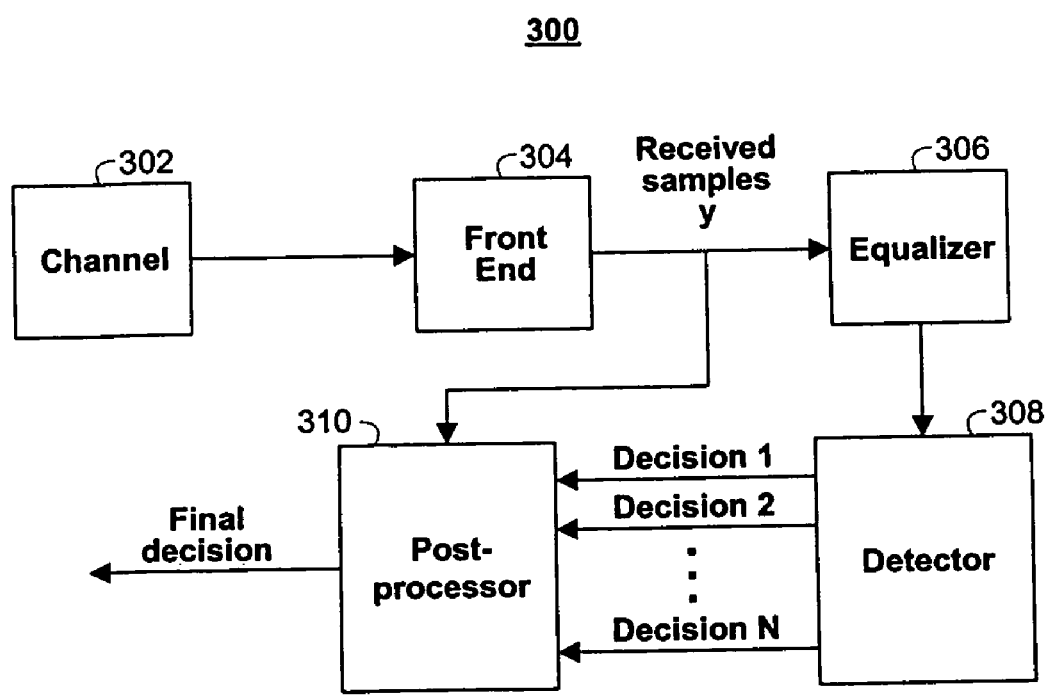
FIG. 3 is a simplified block diagram of illustrative detection apparatus in accordance with one embodiment of the invention.

FIG. 3 shows illustrative detection apparatus 300 in accordance with one embodiment of the invention. An analog read signal may be read from channel 302 by front end 304. For example, channel 302 may be a magnetic recording channel and front end 304 may include analog filters, gain control, and a timing recovery system. Signal samples y may be equalized by equalizer 306 before entering detector block 308. Equalizer 306 may be, for example, a FIR equalizer. Detector block 308 may include any suitable sub-optimal detector. In some embodiments, detector block 308 includes a Viterbi or Viterbi-like detector; however a PRML detector, a tree/trellis detector, a decision feedback detector, or a hybrid detector, for example, may be used in other embodiments. Detector block 308 may create a set of preliminary signal decisions of the channel data and provide these decisions to post-processor block 310.

Signal samples y may also be routed to post-processor block 310. Post-processor block 310 may receive the signal samples and the set of preliminary decisions and compute a metric for each preliminary decision. This metric may be computed by minimizing the decision metric of EQ 5 using any known method. For example, algorithm 500 (FIG. 5) may be used to calculate decision metrics in some embodiments. Post-processor block 310 may compare all the computed decision metrics and output the decision associated with the metric of the lowest cost. This decision may then be output as the final decision of detector block 308.

Although the components of FIG. 3 are depicted as separate devices, the functionality of one or more of the components of FIG. 3 may be integrated into a single device. For example, detector 308 may include post-processor 310 in a single, integrated device. As another example, detector 306 or post-processor 310 may include the equalization functionality of equalizer block 306. Alternatively, in some embodiments, equalization may not be used and equalizer block 306 may be removed from detection apparatus 300 entirely.

Figure 4:
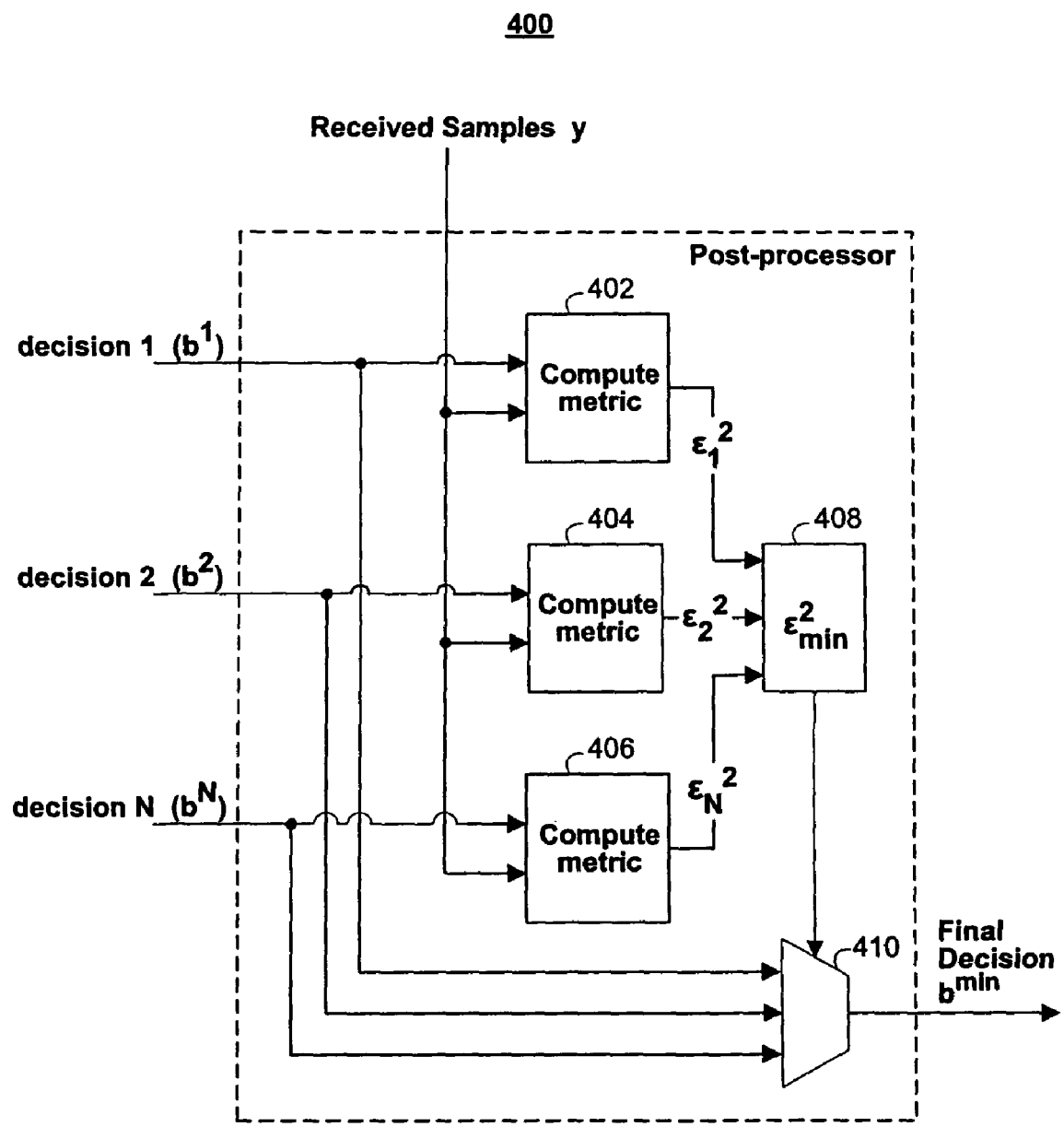
FIG. 4 is a more detailed, yet still simplified, block diagram of the illustrative post-processor circuitry of FIG. 3 in accordance with one embodiment of the invention.

FIG. 4 shows the illustrative post-processor block of FIG. 3 in more detail. Post-processor 400 may receive signal samples y and one or more preliminary signal decisions b". Computation blocks 402, 404, and 406 may compute the decision metric $\epsilon^2$ for each preliminary decision received from detector 308 (FIG. 3). The resultant decision metric of each computation block may be a representation of the total cost (e.g., an estimation of the signal-dependent and additive white noises) associated with the decision. Block 408 may select the smallest decision metric $\epsilon^2$ received from computation blocks 402, 404, and 406. Block 408 may provide the minimum decision metric to multiplexer 410, which selects and outputs the appropriate decision as the detector's final decision.

In the example of FIG. 4, only three computation blocks are shown (one for each of the three received decisions). The three computation blocks depicted in FIG. 4 are shown for clarity only and not by way of limitation. Any finite number of computation blocks may be included in post-processor 400 corresponding to any finite number of received decisions. In addition, preliminary decisions and received signal samples may be queued and processed by a single computation block instead of separate blocks, if desired. Computation blocks 402, 404, 406 may be synchronous or asynchronous blocks.

In some embodiments, all or part of the functionality of post-processor 400 may be performed in software. A program running on a processor may include program logic. The program logic may compute the decision metric $\epsilon^2$ associated with each received preliminary decision b" and select the decision with the smallest metric. The program logic may then output the decision with the smallest metric from post-processor 400. A combination of hardware and software may be used to implement the functionality of post-processor 400 in other embodiments.

Figure 5:
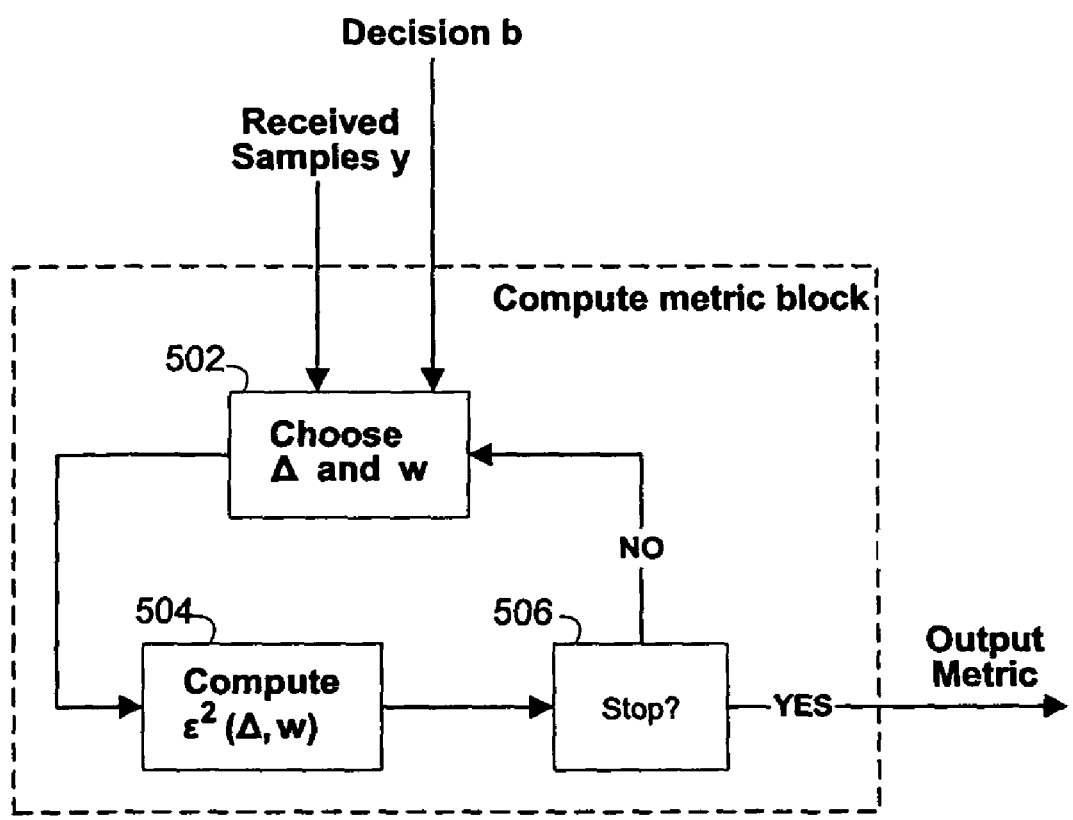
FIG. 5 is a simplified block diagram of an illustrative iterative metric computation block of FIG. 4 in accordance with one embodiment of the invention.

FIG. 5 shows an illustrative algorithm 500 that may be used to calculate decision metrics in accordance with one embodiment of the invention. One or more of computation blocks 402, 404, and 406 of FIG. 4 may use algorithm 500. Algorithm 500 may be an iterative algorithm designed to stop once one or more stop conditions have been met. At block 502, initial values of the transition jitter, $\Delta_k$, and the white noise, $w_k$, may be selected to satisfy EQ 4. The value of the decision metric, $\epsilon^2$, may be computed by block 504 using the current values of $\Delta_k$ and $w_k$. Stopping block 506 may determine if one or more user or system-defined stop conditions have been met. If so, the current value of $\epsilon^2$ may be output of the computation block. If stopping block 506 determines that one or more stop conditions have not been met, new values of $\Delta_k$ and $w_k$ may be selected based on, for example, the current or previous value of $\epsilon^2$, its gradient, or any other suitable criteria.

The stopping criteria used by stopping block 506 may depend on a number of system or user-defined criteria, including, for example, the incoming data rate of the recording channel, the number of decisions to process, overall system performance, and desired metric accuracy. Often times, the performance benefit of stopping the iterative calculation early outweighs the negligible increase in accuracy of the iterative metric. Thus, in some embodiments the stopping criteria is based on the rate of change of $\epsilon^2$. In other embodiments, a user-programmable number of iterations is read by stopping block 506. Algorithm 500 may then automatically stop after the user-programmed number of iterations has been reached.

Figure 6:
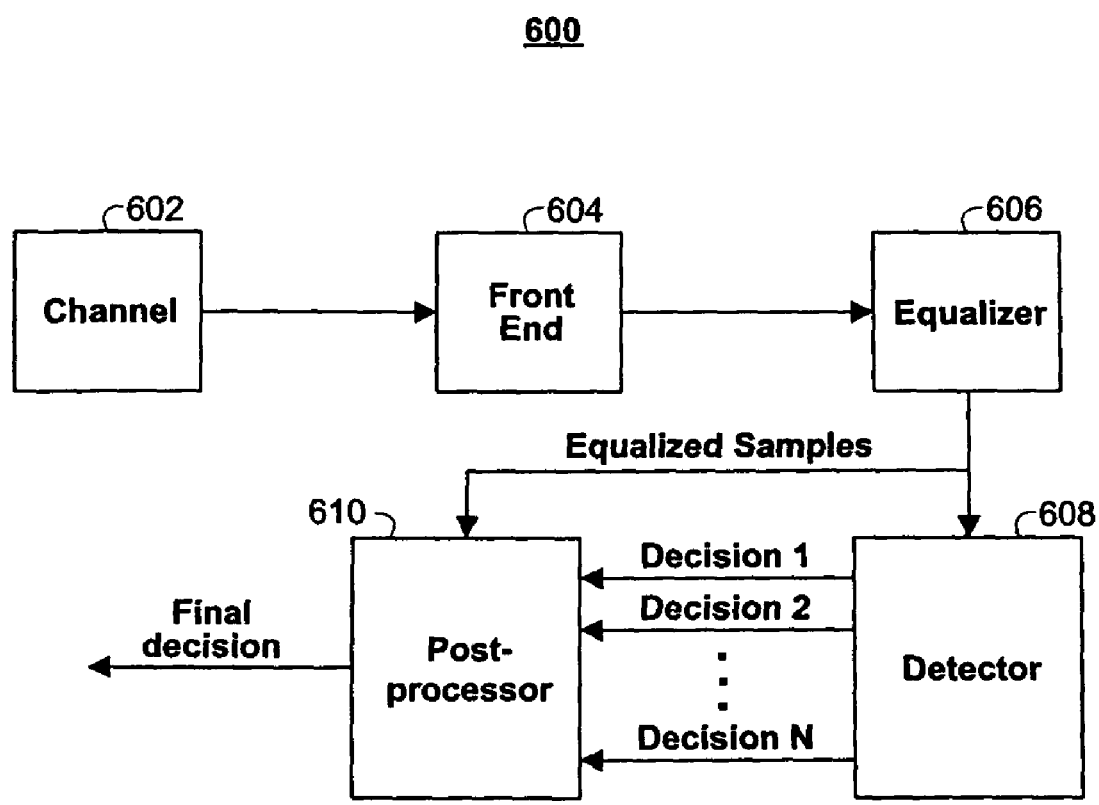
FIG. 6 is an alternative embodiment of the illustrative detection apparatus of FIG. 3.

FIG. 6 shows another illustrative embodiment of the detection apparatus in accordance with the invention. Like detection apparatus 300 (FIG. 3), detection apparatus 600 may include channel 602, front end 604, equalizer 606, detector 608, and post-processor 610. However, post-processor 610 may operate on the output of equalizer 606 rather than the unequalized output of front end 604. If post-processor 610 operates on the output of equalizer 606, the noise models used in EQS 4 and 5 may be slightly different to account for the equalized samples. Otherwise, the operation of detection apparatus 600 may be similar or the same as the operation of detection apparatus 300 (FIG. 3).

Figure 7:
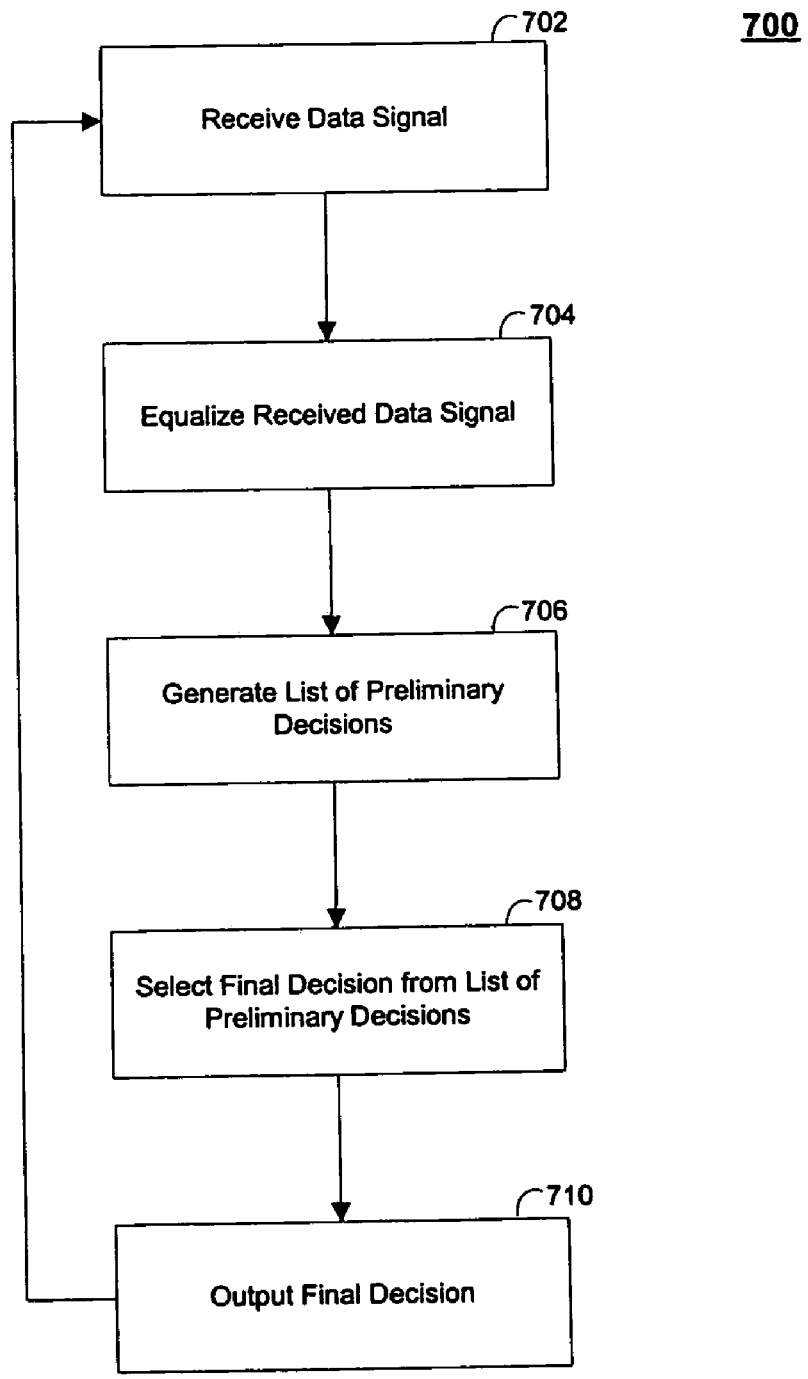
FIG. 7 is a flowchart showing an illustrative process for detecting a signal in accordance with one embodiment of the invention.

FIG. 7 shows illustrative process 700 for correcting the preliminary decision provided by a suboptimal detector. At step 702, the signal is read from the channel. For example, front end 304 (FIG. 3) or 604 (FIG. 6) may read the data stored on a magnetic recording channel. At step 704, the data may be equalized. For example, the read signal may be passed through equalizer 306 (FIG. 3) or 606 (FIG. 6). At step 706, the detector may generate a list of preliminary decisions of the signal received at step 702. The post-processor may then select a final decision from the list of preliminary decisions provided by the detector at step 708. Step 708 is shown in more detail in FIG. 8. The post-processor may output the final decision at step 710 before the illustrative process begins again.

Figure 8:
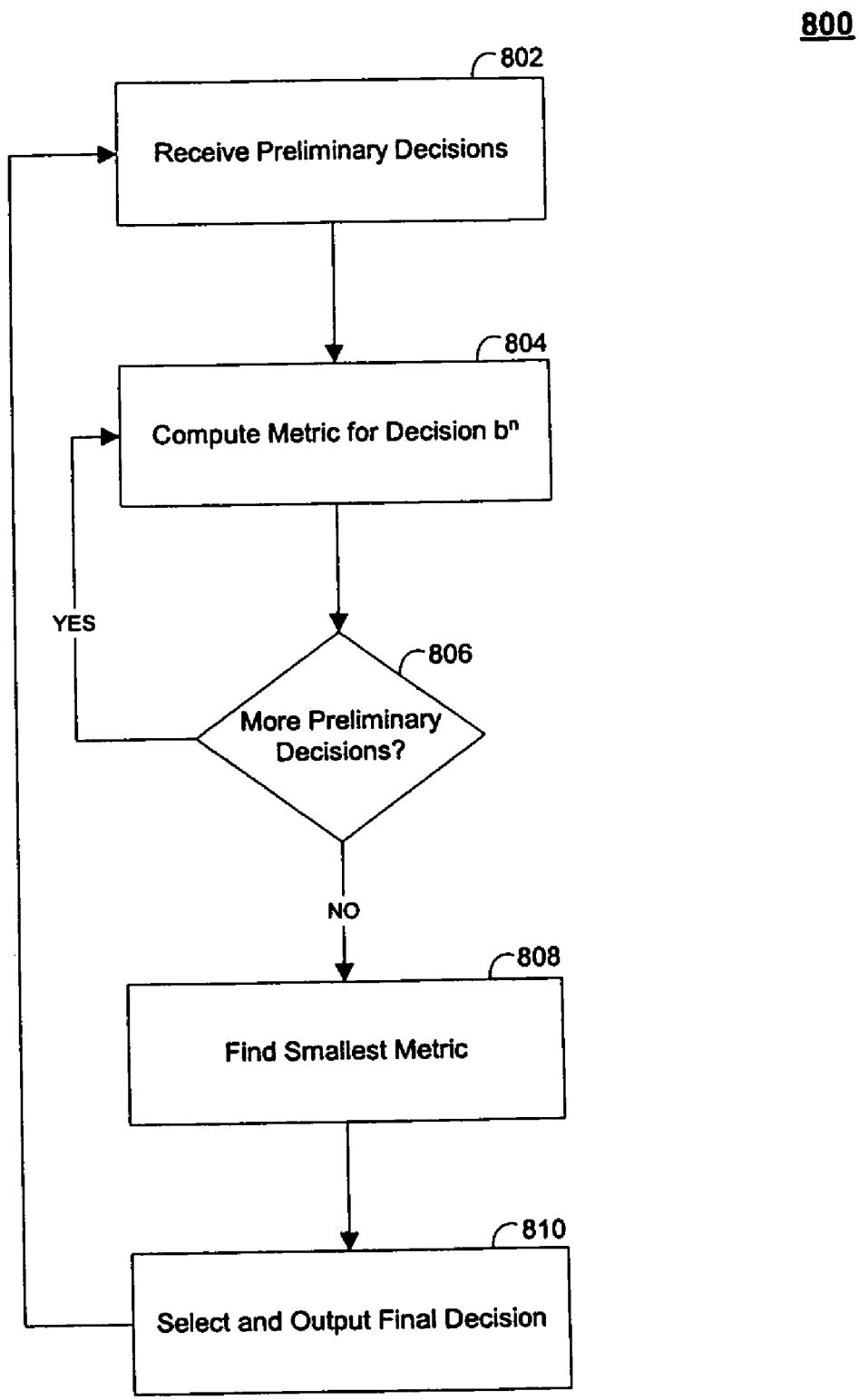
FIG. 8 is a flowchart showing an illustrative process for selecting a final decision from a set of preliminary decisions in accordance with one embodiment of the invention.

FIG. 8 shows illustrative process 800 for computing cost metrics associated with the set of preliminary detector decisions and selecting the final decision of a sub-optimal detector. At step 802, the post-processor may received one or more preliminary detector decisions from a sub-optimal detector. The detector need only provide a reliable list of decisions (i.e., the probability of the true decision being in the list is high). This greatly reduces the complexity of the system because the post-processor may only compute the metrics associated with a small, finite number of potential decisions (as opposed to, for example, the entire tree or trellis). At step 804, the first metric is computed for decision b''. If the post-processor determines that there are more preliminary decisions in the set received from the detector at decision 806, additional metrics may be computed. The post-processor may select the smallest metric at step 808 and output the decision associated with the smallest metric at step 810.

Although the post-processor architecture described above may correct a suboptimal detector's output my modeling transition jitter and white noise, other types of noise may be detected as well. For example, if pulse width noise is a dominant source of noise in a channel, a pulse width noise model may be incorporated into the noise calculations. Thus, the aforementioned post-processing architecture may select the detector decision with the lowest overall weighted sum of the transition jitter, the pulse width noise, and the white noise (or any other desired set of noises) associated with the input signal.

Referring now to FIGS. 9A-9F, various exemplary implementations of the present invention are shown.

Figure 9A:
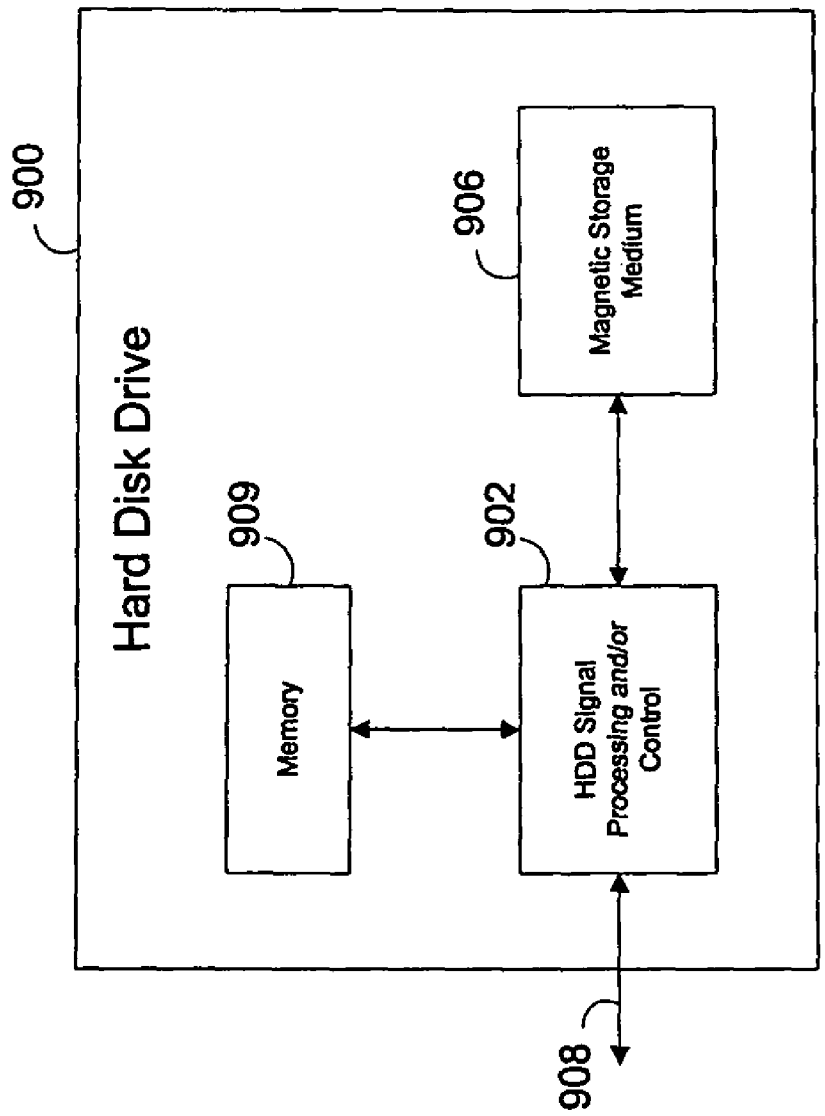
FIG. 9A is a block diagram of an exemplary hard disk drive that can employ the disclosed technology.

Referring now to FIG. 9A, the present invention can be implemented in a hard disk drive 900. The present invention may implement either or both signal processing and/or control circuits, which are generally identified in FIG. 9A at 902. In some implementations, the signal processing and/or control circuit 902 and/or other circuits (not shown) in the HDD 900 may process data, perform coding and/or encryption, perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links 908. The HDD 900 may be connected to memory 909 such as random access memory (RAM), low latency nonvolatile memory such as flash memory, read only memory (ROM) and/or other suitable electronic data storage.

Figure 9B:
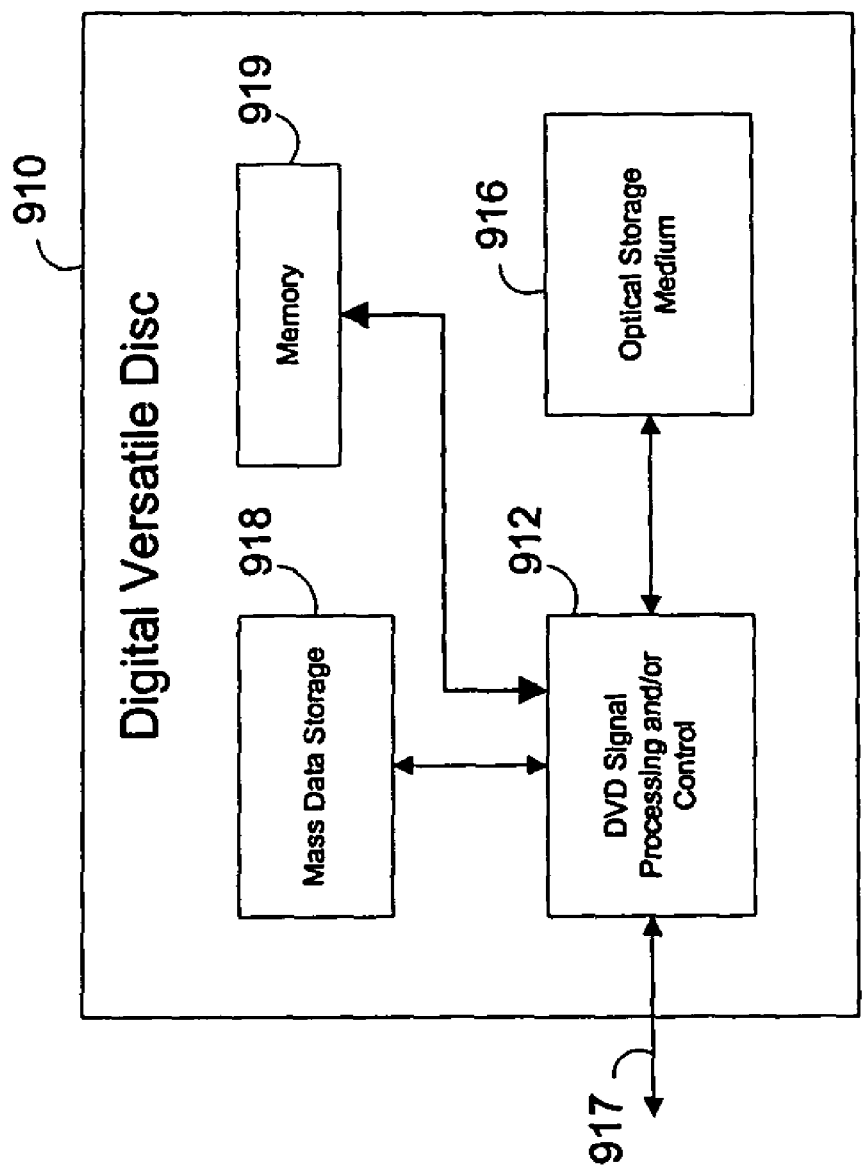
FIG. 9B is a block diagram of an exemplary digital versatile disc that can employ the disclosed technology.

Referring now to FIG. 9B, the present invention can be implemented in a digital versatile disc (DVD) drive 910. The present invention may implement either or both signal processing and/or control circuits, which are generally identified in FIG. 9B at 912, and/or mass data storage of the DVD drive 910. The signal processing and/or control circuit 912 and/or other circuits (not shown) in the DVD 910 may process data, perform coding and/or encryption, perform calculations, and/ or format data that is read from and/or data written to an optical storage medium 916. In some implementations, the signal processing and/or control circuit 912 and/or other circuits (not shown) in the DVD 910 can also perform other functions such as encoding and/or decoding and/or any other signal processing functions associated with a DVD drive.

The DVD drive 910 may communicate with an output device (not shown) such as a computer, television or other device via one or more wired or wireless communication links 917. The DVD 910 may communicate with mass data storage 918 that stores data in a nonvolatile manner. The mass data storage 918 may include a hard disk drive (HDD). The HDD may have the configuration shown in FIG. 9A. The HDD may be a mini HDD that includes one or more platters having a diameter that is smaller than approximately 1.8". The DVD 910 may be connected to memory 919 such as RAM, ROM, low latency nonvolatile memory such as flash memory and/or other suitable electronic data storage.

Figure 9C:
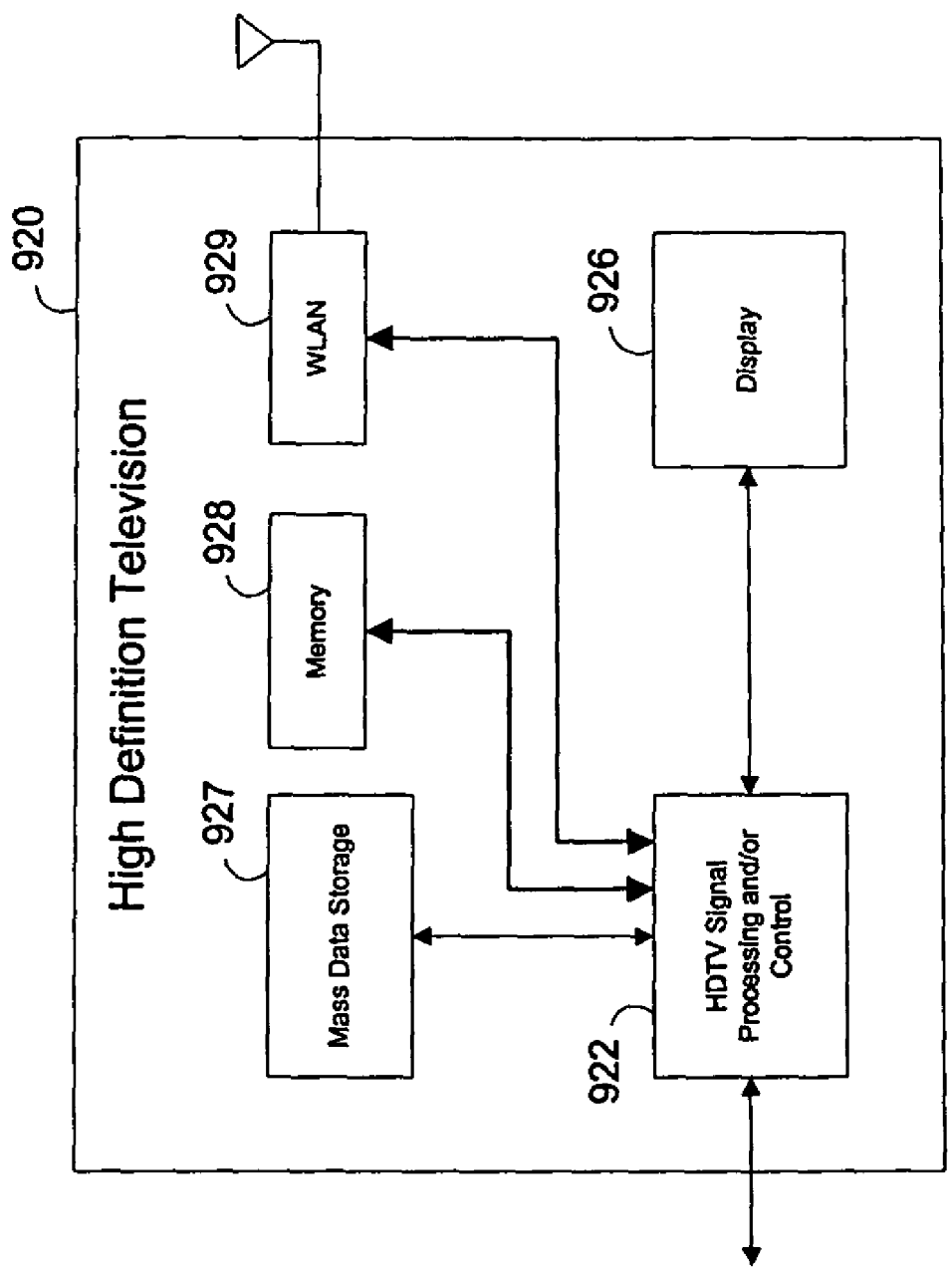
FIG. 9C is a block diagram of an exemplary high definition television that can employ the disclosed technology.

Referring now to FIG. 9C, the present invention can be implemented in a high definition television (HDTV) 920. The present invention may implement either or both signal processing and/or control circuits, which are generally identified in FIG. 9C at 922, a WLAN interface and/or mass data storage of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may support connections with a WLAN via a WLAN network interface 929.

Figure 9D:
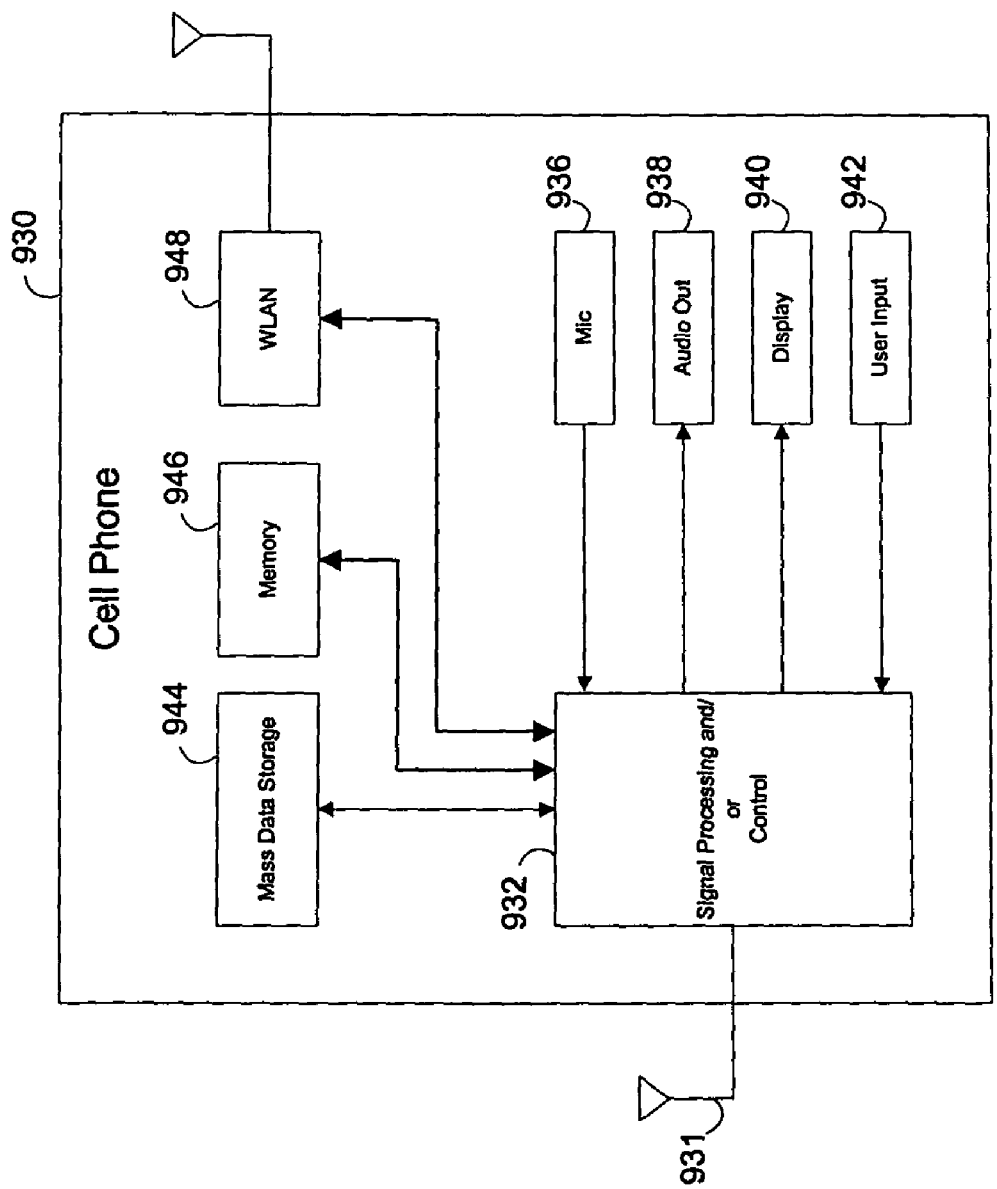
FIG. 9D is a block diagram of an exemplary cell phone that can employ the disclosed technology.

Referring now to FIG. 9D, the present invention can be implemented in a cellular phone 930 that may include a cellular antenna 931. The present invention may implement either or both signal processing and/or control circuits, which are generally identified in FIG. 9D at 932, a WLAN interface and/or mass data storage of the cellular phone 930. In some implementations, the cellular phone 930 includes a microphone 936, an audio output 938 such as a speaker and/or audio output jack, a display 940 and/or an input device 942 such as a keypad, pointing device, voice actuation and/or other input device. The signal processing and/or control circuits 932 and/or other circuits (not shown) in the cellular phone 930 may process data, perform coding and/or encryption, perform calculations, format data and/or perform other cellular phone functions.

The cellular phone 930 may communicate with mass data storage 944 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 930 may be connected to memory 946 such as RAM, ROM, low latency nonvolatile memory such as flash memory and/or other suitable electronic data storage. The cellular phone 930 also may support connections with a WLAN via a WLAN network interface 948.

Figure 9E:
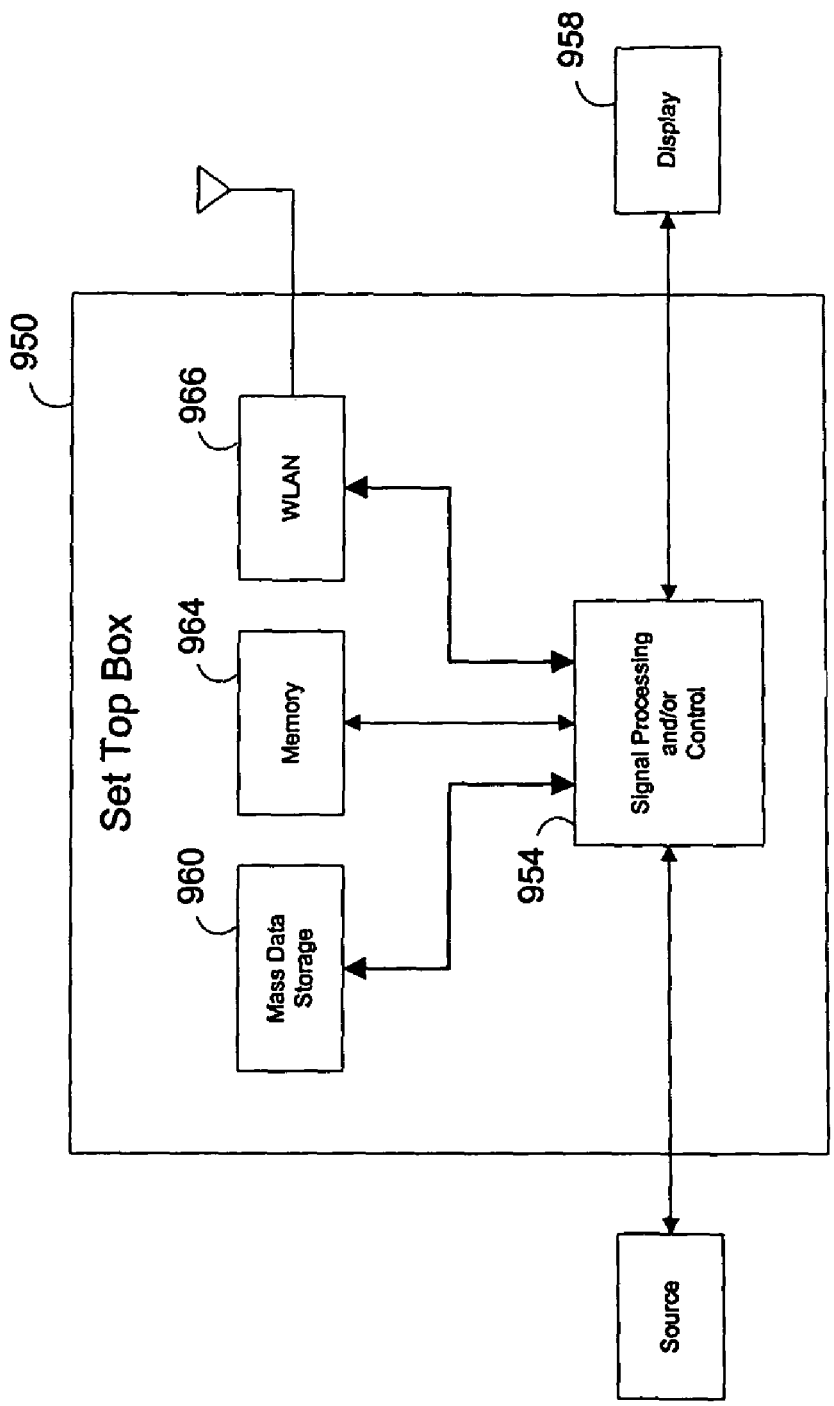
FIG. 9E is a block diagram of an exemplary set top box that can employ the disclosed technology.

Referring now to FIG. 9E, the present invention can be implemented in a set top box 950. The present invention may implement either or both signal processing and/or control circuits, which are generally identified in FIG. 9E at 954, a WLAN interface and/or mass data storage of the set top box 950. The set top box 950 receives signals from a source such as a broadband source and outputs standard and/or high definition audio/video signals suitable for a display 958 such as a television and/or monitor and/or other video and/or audio output devices. The signal processing and/or control circuits 954 and/or other circuits (not shown) of the set top box 950 may process data, perform coding and/or encryption, perform calculations, format data and/or perform any other set top box function.

The set top box 950 may communicate with mass data storage 960 that stores data in a nonvolatile manner. The mass data storage 960 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 950 may be connected to memory 964 such as RAM, ROM, low latency nonvolatile memory such as flash memory and/or other suitable electronic data storage. The set top box 950 also may support connections with a WLAN via a WLAN network interface 966.

Figure 9F:
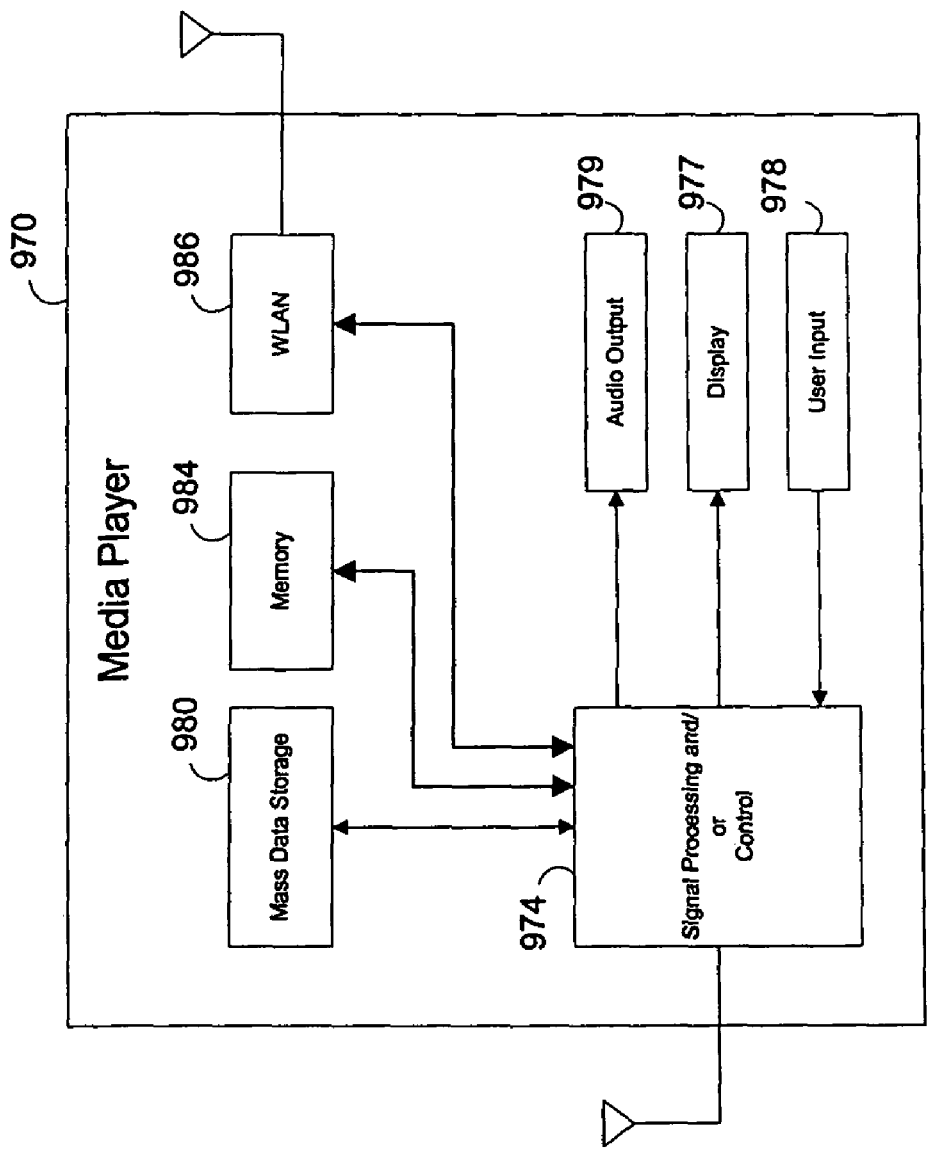
FIG. 9F is a block diagram of an exemplary media player that can employ the disclosed technology.

Referring now to FIG. 9F, the present invention can be implemented in a media player 970. The present invention may implement either or both signal processing and/or control circuits, which are generally identified in FIG. 9F at 974, a WLAN interface and/or mass data storage of the media player 970. In some implementations, the media player 970 includes a display 977 and/or a user input 1108 such as a keypad, touchpad and the like. In some implementations, the media player 970 may employ a graphical user interface (GUI) that typically employs menus, drop down menus, icons and/or a point-and-click interface via the display 977 and/or user input 978. The media player 970 further includes an audio output 979 such as a speaker and/or audio output jack. The signal processing and/or control circuits 974 and/or other circuits (not shown) of the media player 970 may process data, perform coding and/or encryption, perform calculations, format data and/or perform any other media player function.

The media player 970 may communicate with mass data storage 980 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 970 may be connected to memory 974 such as RAM, ROM, low latency nonvolatile memory such as flash memory and/or other suitable electronic data storage. The media player 970 also may support connections with a WLAN via a WLAN network interface 986. Still other implementations in addition to those described above are contemplated.

It will be understood that the foregoing is only illustrative of the principles of the invention, and that various modifications can be made by those skilled in the art without departing from the scope and spirit of the invention.

What is claimed is:

1. A signal detector for detecting data in an input signal, the signal detector comprising:
   a sub-optimal detector to generate a set of preliminary detector paths corresponding to the data in the input signal; and
   a non-linear post-processor configured to:
      receive the input signal and the set of preliminary detector paths;
      for each path in the set, iteratively compute candidate cost metrics until a stopping condition has been met;
      assign a final cost metric to each path in the set based at least in part on the candidate cost metrics; and
      select one of the preliminary detector paths in the set based on the final cost metrics.

2. The signal detector of claim 1 wherein the non-linear post-processor is further configured to estimate white noise for each path in the set and assign the final cost metric based at least in part on the white noise estimate for the path.

3. The signal detector of claim 1 wherein the non-linear post-processor is further configured to output the selected preliminary signal detector path as a final output of the detector.

4. The signal detector of claim 1 further comprising an equalizer to equalize the input signal.

5. The signal detector of claim 1 wherein the sub-optimal detector is selected from the group consisting of a linear Viterbi detector, a non-linear Viterbi detector, a Viterbi-like detector, a PRML detector, a tree/trellis detector, a decision feedback detector, and a hybrid detector.

6. The signal detector of claim 1 wherein the final cost metric for each path in the set comprises an approximation of transition jitter.

7. The signal detector of claim 1 wherein the final cost metric for each path in the set is directly proportional to an approximation of at least one form of signal dependent noise.

8. The signal detector of claim 7 wherein the approximation comprises a second-order Taylor approximation.

9. The signal detector of claim 7 wherein the approximation comprises a value for the signal-dependent noise obtained from a look-up table.

10. A method for detecting data in an input signal, the method comprising:
generating a set of preliminary detector paths corresponding to the data in the input signal;
for each path in the set, iteratively computing candidate cost metrics until a stopping condition has been met;
assigning a final cost metric to each path in the set based at least in part on the candidate cost metrics; and
selecting one of the preliminary detector paths based on the final cost metrics.

11. The method of claim 10 further comprising estimating white noise for each path in the set and assigning the final cost metric based at least in part on the white noise estimate for the path.

12. The method of claim 10 further comprising outputting the selected preliminary detector path as the final output of a detector.

13. The method of claim 10 further comprising equalizing the input signal.

14. The method of claim 10 wherein the final cost metric for each path in the set comprises an approximation of transition jitter.

15. The method of claim 10 wherein the final cost metric for each path in the set is directly proportional to an approximation of at least one form of signal dependent noise.

16. The method of claim 15 wherein the approximation comprises a second-order Taylor approximation.

17. The method of claim 15 further comprising looking the approximation up in a look-up table.

18. A signal detector for detecting data in an input signal, the signal detector comprising:
means for generating a set of preliminary detector paths corresponding to the data in the input signal;
for each path in the set, means for iteratively computing candidate cost metrics until a stopping condition has been met;
means for assigning a final cost metric to each path in the set based at least in part on the candidate cost metrics; and
means for selecting one of the preliminary detector paths in the set based on the final cost metrics.

19. The signal detector of claim 18 further comprising means for estimating white noise for each path in the set and means for assigning the final cost metric based at least in part on the white noise estimate for the path.

20. The signal detector of claim 18 further comprising means for outputting the selected preliminary detector path as the final output of the detector.

21. The signal detector of claim 18 further comprising means for equalizing the input signal.

22. The signal detector of claim 18 wherein the means for generating a set of preliminary detector paths corresponding to the data in the input signal comprises a sub-optimal detector.

23. The signal detector of claim 22 wherein the sub-optimal detector is selected from the group consisting of a linear Viterbi detector, a non-linear Viterbi detector, a Viterbi-like detector, a PRML detector, a tree/trellis detector, a decision feedback detector, and a hybrid detector.

24. The signal detector of claim 18 wherein the final cost metric for each path in the set comprises an approximation of transition jitter.

25. The signal detector of claim 18 wherein the final cost metric for each path in the set is directly proportional to an approximation of at least one form of signal dependent noise.

26. The signal detector of claim 25 wherein the approximation comprises a second-order Taylor approximation.

27. The signal detector of claim 25 wherein the approximation comprises a value for the signal-dependent noise obtained from a look-up table.

28. A receiver for reading a data signal from a recording channel, the receiver comprising:
a signal processor to filter a communications signal and generate an input signal therefrom;
a signal detector to detect data in the input signal, the signal detector comprising:
a sub-optimal detector to generate a set of preliminary detector paths corresponding to the data in the input signal; and
a non-linear post-processor configured to:
receive the input signal and the set of preliminary detector paths;
for each path in the set iteratively compute candidate cost metrics until a stopping condition has been met;
assign a final cost metric for each path in the set based at least in part on the candidate cost metrics; and
select one of the preliminary detector paths in the set based on the final cost metrics.

29. The receiver of claim 28 wherein the non-linear post-processor is further configured to estimate white noise for each path in the set and assign the final cost metric based at least in part on the white noise estimate for the path.

30. The receiver of claim 28 wherein the non-linear post-processor is further configured to output the selected preliminary detector path as a final output of the signal detector.

31. The receiver of claim 28 further comprising an equalizer to equalize the input signal.

32. The receiver of claim 28 wherein the sub-optimal detector is selected from the group consisting of a linear Viterbi detector, a non-linear Viterbi detector, a Viterbi-like detector, a PRML detector, a tree/trellis detector, a decision feedback detector, and a hybrid detector.

33. The receiver of claim 28 wherein the final cost metric for each path in the set comprises an approximation of transition jitter.

34. The receiver of claim 28 wherein the final cost metric for each path in the set is directly proportional to an approximation of at least one form of signal dependent noise.

35. The receiver of claim 34 wherein the approximation comprises a second-order Taylor approximation.

36. The receiver of claim 34 wherein the approximation comprises a value for the signal-dependent noise obtained from a look-up table.

37. The signal detector of claim 7 wherein the at least one form of signal-dependent noise comprises pulse width noise.

38. The method of claim 15 wherein the at least one form of signal-dependent noise comprises pulse width noise.

39. The signal detector of claim 25 wherein the at least one form of signal-dependent noise comprises pulse width noise.

40. The receiver of claim 34 wherein the at least one form of signal-dependent noise comprises pulse width noise.

41. The signal detector of claim 1 wherein the stopping condition comprises a threshold rate of change of the computed candidate cost metrics for each path.

42. The method of claim 10 wherein the stopping condition comprises a threshold rate of change of the computed candidate cost metrics for each path.

43. The signal detector of claim 18 wherein the stopping condition comprises a threshold rate of change of the computed candidate cost metrics for each path.

44. The receiver of claim 28 wherein the stopping condition comprises a threshold rate of change of the computed candidate cost metrics for each path.

* * * * *